(12) United States Patent
Israeli et al.

(10) Patent No.: US 10,013,694 B1
(45) Date of Patent: Jul. 3, 2018

(54) OPEN DATA COLLECTION FOR THREAT INTELLIGENCE POSTURE ASSESSMENT

(71) Applicant: EMC Corporation, Hopkinton, MA (US)

(72) Inventors: Shachar Israeli, Hod Hasharon (IL); Ereli Eran, Rechovot (IL); Alex Zaslavsky, Petah Tiqwa (IL); Marcelo Blatt, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 14/144,007

(22) Filed: Dec. 30, 2013

(51) Int. Cl.
*G06Q 20/40* (2012.01)
*G06Q 50/00* (2012.01)

(52) U.S. Cl.
CPC ......... *G06Q 20/4016* (2013.01); *G06Q 50/01* (2013.01)

(58) Field of Classification Search
CPC ..... G06Q 20/40; G06Q 20/32; G06Q 20/4016
USPC ...................................... 705/35–45
See application file for complete search history.

(56) References Cited

U.S. PATENT DOCUMENTS

| | | | | |
|---|---|---|---|---|
| 8,635,117 B1 * | 1/2014 | Acuna-Rohter | ....... | G06Q 20/40 705/14.26 |
| 8,660,864 B2 * | 2/2014 | Krause | ................... | G06Q 40/08 705/4 |
| 8,782,217 B1 * | 7/2014 | Arone | ................... | H04W 12/08 709/224 |
| 8,800,005 B2 | 8/2014 | Lunt | | |
| 8,856,879 B2 | 10/2014 | Schechter et al. | | |
| 8,914,848 B2 | 12/2014 | Castro et al. | | |
| 8,918,468 B1 * | 12/2014 | Fisher | ................. | H04M 3/5191 705/319 |
| 8,983,868 B1 * | 3/2015 | Sehrer | ................ | G06Q 20/3224 705/1.1 |
| 9,177,060 B1 * | 11/2015 | Bennett | ............. | G06F 17/30864 |
| 2008/0140576 A1 * | 6/2008 | Lewis | ................ | G06Q 10/0635 705/67 |

(Continued)

FOREIGN PATENT DOCUMENTS

WO WO-2014089309 A1 * 6/2014 ........... G06Q 20/223

OTHER PUBLICATIONS

Groenfeldt, Tom, "Social Media Can Reduce Credit Card Fraud", Jan. 30, 2012, Forbes, 2 pages, <http://www.forbes.com/sites/tomgroenfeldt/2012/01/30/socialmediacanreducecardfraudandoveractivecardblocking/>.*

(Continued)

*Primary Examiner* — Bruce I Ebersman
*Assistant Examiner* — Joshua D. Bradley
(74) *Attorney, Agent, or Firm* — BainwoodHuang

(57) ABSTRACT

An improved technique involves inputting data in postings from social media or news websites into a risk engine. A posting extraction device continually observes postings aggregated in social media and news websites, such as Twitter, Facebook, CNN, and the like. The posting extraction device parses postings that contain specified keywords such as "credit card," "account number," and the like. The posting extraction device also parses these postings for metadata such as user identifiers, times, and locations. The posting extraction device then stores the parsed information in a transaction database that is accessed by an adaptive authentication engine for risk score assignment.

12 Claims, 5 Drawing Sheets

(56) References Cited

U.S. PATENT DOCUMENTS

| | | | | |
|---|---|---|---|---|
| 2010/0094767 A1* | 4/2010 | Miltonberger | ....... | G06Q 10/067 705/325 |
| 2010/0114899 A1* | 5/2010 | Guha | ................ | G06F 17/30867 707/741 |
| 2010/0306099 A1* | 12/2010 | Hirson | .................... | G06Q 20/10 705/38 |
| 2011/0184838 A1* | 7/2011 | Winters | ................. | G06Q 20/10 705/27.1 |
| 2011/0191200 A1* | 8/2011 | Bayer | .................... | G06Q 20/12 705/26.1 |
| 2012/0158589 A1* | 6/2012 | Katzin | .................... | G06Q 20/12 705/44 |
| 2012/0159647 A1* | 6/2012 | Sanin et al. | ..................... | 726/28 |
| 2012/0180135 A1* | 7/2012 | Hodges | .................. | G06Q 10/10 726/26 |
| 2012/0191594 A1* | 7/2012 | Welch | .................... | G06Q 40/02 705/38 |
| 2012/0191596 A1* | 7/2012 | Kremen | ................. | G06Q 40/02 705/38 |
| 2012/0191606 A1* | 7/2012 | Milne | .................... | G06Q 10/101 705/44 |
| 2012/0221357 A1* | 8/2012 | Krause | .................... | G06Q 40/08 705/4 |
| 2012/0239479 A1* | 9/2012 | Amaro | ................. | G06Q 20/102 705/14.23 |
| 2013/0124192 A1* | 5/2013 | Lindmark et al. | ................. | 704/9 |
| 2013/0144785 A1* | 6/2013 | Karpenko | ............ | G06Q 20/409 705/44 |
| 2013/0239185 A1* | 9/2013 | Orttung | .................... | G06F 21/40 726/5 |
| 2013/0239217 A1* | 9/2013 | Kindler | ............. | G06F 17/30958 726/25 |
| 2013/0339457 A1* | 12/2013 | Freire | .................... | G06Q 50/01 709/206 |
| 2013/0340089 A1* | 12/2013 | Steinberg | ................ | H04L 63/10 726/27 |
| 2014/0012738 A1* | 1/2014 | Woo | ........................ | G06Q 30/06 705/39 |
| 2014/0040086 A1* | 2/2014 | Abbatiello | ......... | G06Q 20/4016 705/35 |
| 2014/0067656 A1* | 3/2014 | Cohen Ganor et al. | ......... | 705/39 |
| 2014/0172495 A1* | 6/2014 | Schneck | ............. | G06Q 10/0635 705/7.28 |
| 2014/0222616 A1* | 8/2014 | Siemiatkowski | ...... | G06Q 20/12 705/26.8 |
| 2014/0282870 A1* | 9/2014 | Markwordt | ............. | H04L 63/08 726/3 |
| 2014/0282930 A1* | 9/2014 | Markwordt | ........ | G06Q 20/4014 726/5 |
| 2015/0106216 A1* | 4/2015 | Kenderov | .......... | G06Q 20/4014 705/21 |
| 2015/0127535 A1* | 5/2015 | Chavarria | ............ | G06Q 20/409 705/44 |
| 2015/0161610 A1* | 6/2015 | Sahadevan | ......... | G06Q 20/4016 705/44 |
| 2015/0170148 A1* | 6/2015 | Priebatsch | ......... | G06Q 20/4016 705/44 |

OTHER PUBLICATIONS

Adams, John, "Five Ways Banks Should Be Using Social Media", Feb. 1, 2013, American Banker, 6 pages, <https://www.americanbanker.com/news/five-ways-banks-should-be-using-social-media>.*

Sandberg, Erica, "Social networking: Your key to easy credit?", Jan. 13, 2010, CreditCards.com, 4 pages, <http://www.creditcards.com/credit-card-news/social-networking-social-graphs-credit-1282.php>.*

* cited by examiner

Fig. 4

Posting 60

```
1.  {
2.      {
3.          "coordinates": 42.36, -71.13
4.          "created At":  "Thu Oct 14 16:55:15 +0000 2013"
5.          "favorited":    false
6.          "entities":   {
7.          "urls": [
8.          ]
9.      }
10.         "text": "Hi man my credit card was stolen. What a bummer..."
11.         "annotations": null
12.         "contributors": [
13.             {
14.                 "id":  819797
15.                 "id_str": "819797"
16.                 "screen_name": "johndoe"
17.                 "name": "Arnaud Meunier"
18.
19.             }
20.         ],
21. }
```

Metadata 62

Extracted Data 64

Posting Location = (42.36, -71.13)
Posting Time = Thu Oct 14 16:55:15 +0000 2013
User Identifier = "Arnaud Meunier"
Posting Text: Hi man my *credit card* was stolen. What a bummer...

Keyword 66

Sentiment Analysis 68

"credit card"  "stolen"  "bummer"

Transaction Data 70

Initiation Location = (42.37, -71.17)
Posting Time = Thu Oct 14 17:14:18 +0000 2013
User Identifier = "Arnaud Meunier"
Transaction Amount: $2327.86

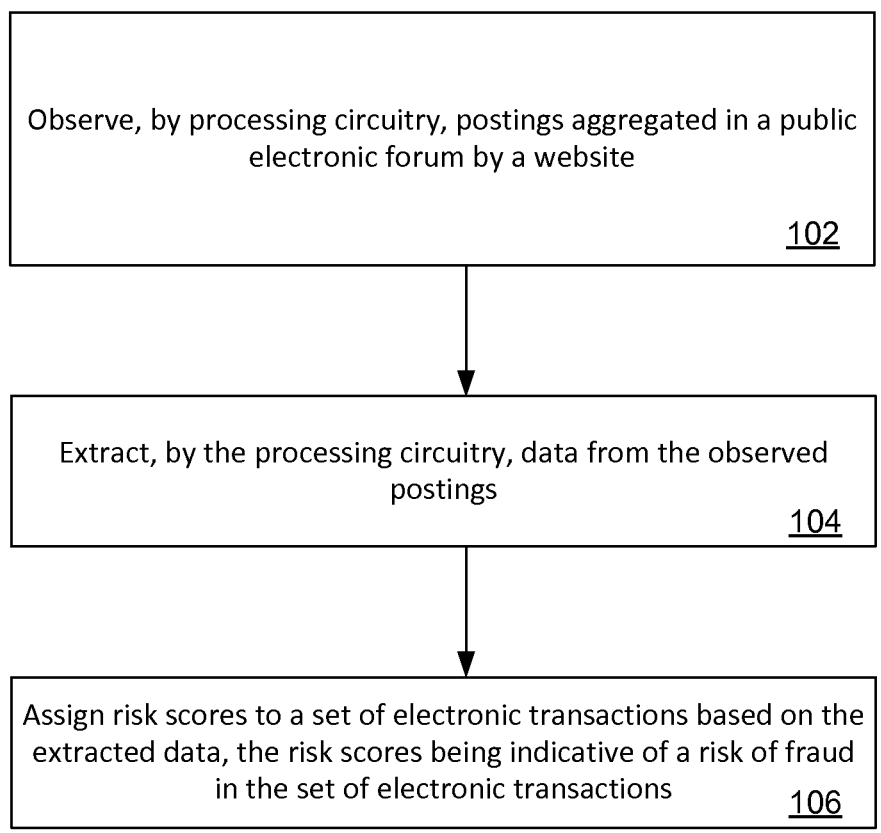

OPEN DATA COLLECTION FOR THREAT INTELLIGENCE POSTURE ASSESSMENT

BACKGROUND

Some online banks use adaptive authentication. Such risk-based authentication systems assign risk scores to banking transactions where higher risk scores indicate higher risk.

In generating a risk score, conventional adaptive authentication systems take as input values of various transaction attributes (e.g., time of receipt, geolocation, transaction amount). For each customer of the online bank, there is an associated history based on values of the attributes associated with previous transactions involving that customer. The adaptive authentication system incorporates the history associated with the customer into an evaluation of the risk score. Significant variation of one or more attribute values from those in the customer's history may signify that the banking transaction has a high risk.

For example, suppose that a customer has historically submitted transaction requests via a credit card to the online bank at about 5 PM from Boston, Mass., and, using the customer's credit card information, a user submits a new transaction request at 2 AM from Boise, Id. In this case, the risk engine would assign a larger risk score to a transaction resulting from the new transaction request.

SUMMARY

Unfortunately, there are deficiencies with the above-described conventional adaptive authentication systems. For example, the computation of the risk scores may not be based on the most recent information available. Along these lines, suppose that the above-described customer in Boston has had his credit card stolen just prior to normal usage. If the thief uses the credit card quickly thereafter in a nearby location, then the adaptive authentication module may process the transaction with a low risk score that fails to take the stolen credit card into account.

It should be understood that social media sites (e.g., Twitter, Facebook, Tumblr, and the like) and news sites (e.g., CNN, Reddit, and the like) have the capability to make real-time information publicly available. To continue the above example, if the customer who experienced the theft were to announce the theft on his Twitter account, then the information about the theft would be made available to anyone who has access to this form of open social media, i.e., the online public.

In contrast with the above-described conventional adaptive authentication systems which may be using outdated information in assessing risk, an improved technique involves inputting data in postings from social media or news websites into a risk engine. A posting extraction device continually observes postings aggregated in social media and news websites, such as Twitter, Facebook, CNN, and the like. The posting extraction device parses postings that contain specified keywords such as "credit card," "account number," and the like. The posting extraction device also parses these postings for metadata such as user identifiers, times, and locations. The posting extraction device then stores the parsed information in a transaction database that is accessed by an adaptive authentication engine for risk score assignment.

Advantageously, the improved technique bases risk assessment on the most recent information available. In the above example, suppose that the customer who had his credit card stolen posted information about the theft to his Twitter account. Because the posting extraction device is continually observing sites like Twitter for such information, the very recent theft of the credit card may be taken into account in computing risk scores. The time it takes for the information to reach a risk engine is only limited by the amount of time the customer takes to post the information to social media.

One embodiment of the improved technique is directed to a method of providing security. The method includes observing, by processing circuitry, postings aggregated in a public electronic forum by a website. The method also includes extracting, by the processing circuitry, data from the observed postings. The method further includes assigning risk scores to a set of electronic transactions based on the extracted data, the risk scores being indicative of a risk of fraud in the set of electronic transactions.

In some arrangements, observing the postings aggregated in the public forum includes verifying whether the postings include any of a set of keywords, each of the set of keywords having a specified impact on the risk score. In such arrangements, extracting data from the postings includes obtaining keywords of the set of keywords verified to be included in the postings.

In some arrangements, each of the set of electronic transactions includes values of transaction parameters. Each posting includes metadata, the metadata including values of posting parameters. In such an arrangement, the method further includes extracting metadata of the postings and storing the values of the posting parameters in a database containing values of the transaction parameters, and assigning the risk scores includes accessing values of the posting parameters stored in the database.

In some arrangements, the posting parameters of the metadata of a posting include a user identifier. In such an arrangement, storing the values of the posting parameters in the database includes placing the values of the posting parameters in a location in the database according to the user identifier.

In some arrangements, assigning the risk scores to the set of electronic transactions further includes performing a comparison operation on a value of a transaction parameter of an electronic transaction of the set of electronic transactions with a value of a posting parameter of the set of posting parameters of the extracted metadata, and generating the risk score based on a result of the comparison operation.

In some arrangements, the posting parameters of the metadata of a posting include a time of the posting being introduced into the public forum. In such an arrangement, performing the comparison operation includes comparing the value of the time of the posting being introduced into the public forum with a time at which a transaction was initiated to produce a time difference, the risk score being based on the time difference.

In some arrangements, the posting parameters of the metadata of a posting include a geolocation indicating a location where the posting was introduced into the public forum. In such an arrangement, performing the comparison operation includes comparing the value of the geolocation of the posting with a geolocation at which a transaction was initiated to produce a location difference, the risk score being based on the location difference.

In some arrangements, the method further includes performing sentiment analysis on the obtained keywords, a result of the sentiment analysis being one of a negative sentiment and a positive sentiment. In such an arrangement, assigning the risk scores includes generating the risk score based on the result of sentiment analysis.

Additionally, some embodiments of the improved technique are directed to an apparatus constructed and arranged to provide security. The apparatus includes memory and a set of processors coupled to the memory to form controlling circuitry. The controlling circuitry is constructed and arranged to carry out a method of providing security.

Furthermore, some embodiments of the improved technique are directed to a computer program product having a non-transitory computer-readable storage medium which stores code including a set of instructions which, when executed by a data storage system, cause the data storage system to carry out a method of providing security.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4 is a block diagram illustrating an example posting extracted by the posting extraction device shown in FIG. 2.

FIG. 5 is a flow chart illustrating an example method of carrying out the improved technique within the electronic environment shown in FIG. 1.

DETAILED DESCRIPTION

An improved technique involves inputting data in postings from social media or news websites into a risk engine. A posting extraction device continually observes postings aggregated in social media and news websites, such as Twitter, Facebook, CNN, and the like. The posting extraction device parses postings that contain specified keywords such as "credit card," "account number," and the like. The posting extraction device also parses these postings for metadata such as user identifiers, times, and locations. The posting extraction device then stores the parsed information in a transaction database that is accessed by an adaptive authentication engine for risk score assignment.

Advantageously, the improved technique bases risk assessment on the most recent information available. In the above example, suppose that the customer who had his credit card stolen posted information about the theft to his Twitter account. Because the posting extraction device is continually observing sites like Twitter for such information, the very recent theft of the credit card may be taken into account in computing risk scores. The time it takes for the information to reach a risk engine is only limited by the amount of time the customer takes to post the information to social media.

Figure 1:
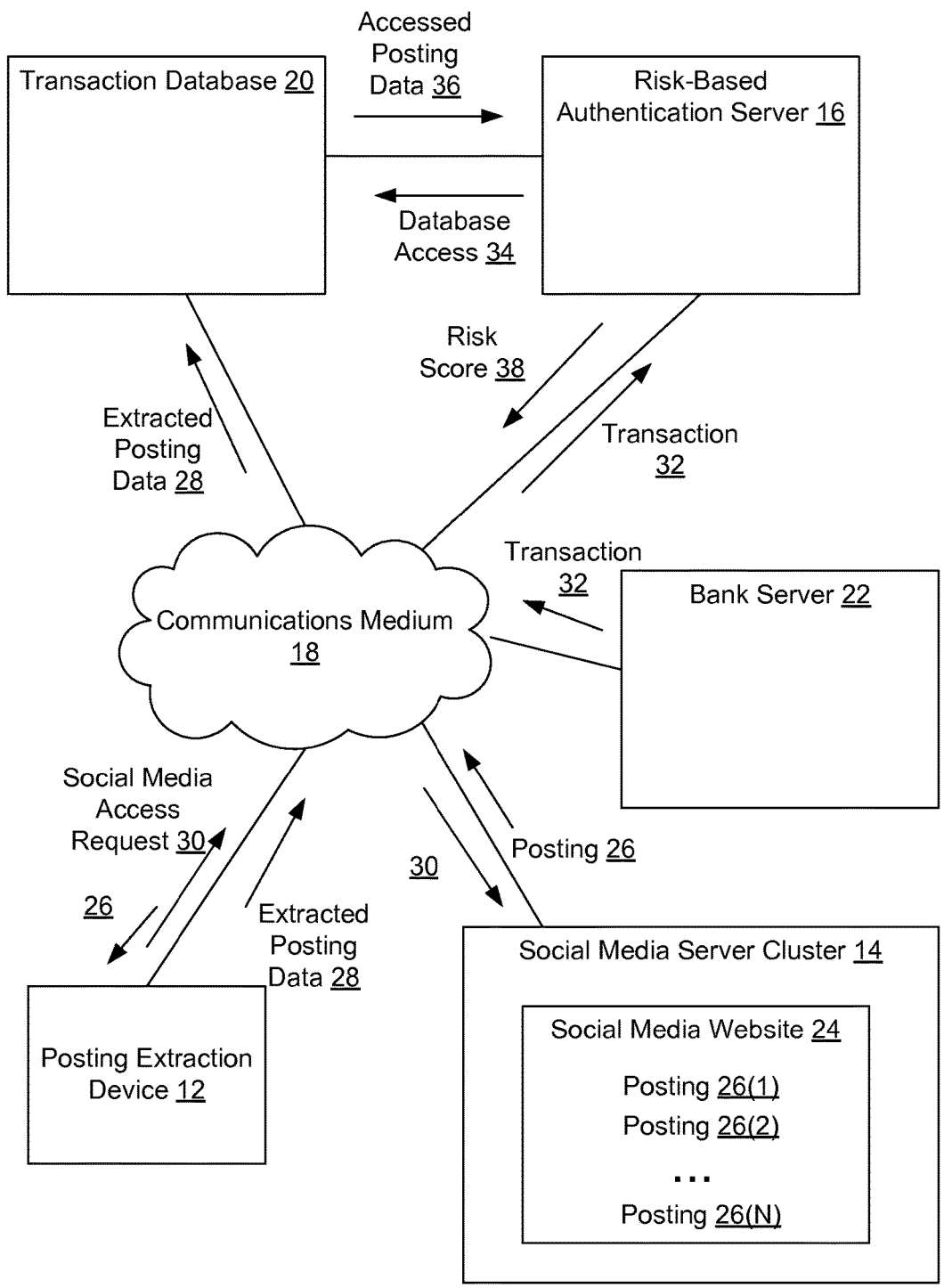
FIG. 1 is a block diagram illustrating an example electronic environment in which the improved technique may be carried out.

FIG. 1 illustrates an example electronic environment 10 in which the improved technique can be carried out. Electronic environment 10 includes posting extraction device 12, social media server cluster 14, risk-based authentication server 16, communications medium 18, transaction database 20, and bank server 22.

Posting extraction device 12 is configured to continually observer social media and news sites for postings that contain particular keywords of interest to risk calculation. Posting extraction device 12 also configured to extract those postings, parse data and metadata from each extracted posting, and send the data and metadata to transaction database 20. Posting extraction device 12 as described below is a computing device such as a desktop personal computer, although in some arrangements, posting extraction device 12 may be a server, a laptop computer, or the like.

Social media server cluster 14 is configured to receive postings 26(1), 26(2), . . . , 26(N) (postings 26) from account holders and make the postings available in social media website 24. For example, when social media website 24 is Twitter, social media server cluster 14 receives tweets 26 that contain text and/or pictures, stores the tweets in a database (not pictured), and posts the Tweets in a public electronic forum in the form of website 24. Human observers of such a website may view the postings in a browser window on a computing device. Social media server cluster 14, however, may make posting feeds available which include posting metadata via an application programming interface (API).

Risk-based authentication server 16 is configured to assign risk scores to transactions based on information available in transaction database 20, including information extracted from postings 26. Risk-based authentication server 16 is further configured generate database queries 34 upon receipt of transactions 32 from bank server 22.

Transaction database 20 is configured to store information relevant for assessing risk associated with transactions 32. For example, transaction database 20 stores information associated with historical behavior associated with users. Transaction database 20 also stores extracted posting data 28 which may be associated with users or accounts. Transaction database 20 also accepts store commands from posting extraction device 12, and access queries 34 from rosk-based authentication server 16.

Bank server 22 is configured to verify authentication of users initiating transactions 32 with risk-based authentication server 16. It should be understood that this server 22 may be associated with any service provider that may benefit from an authentication system, e.g., a government, a corporation, an online retailer, and the like.

Communications medium 18 provides network connections between posting extraction device 12, social media server cluster 14, risk-based authentication server 16, transaction database 20, and bank server 22. Communications medium 18 may implement a variety of protocols such as TCP/IP, UDP, ATM, Ethernet, Fibre Channel, combinations thereof, and the like. Furthermore, communications medium 18 may include various components (e.g., cables, wireless, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

During operation, posting extraction device 12 sends, on a continuous basis, social media access requests 30 to social media server cluster 14 for access to postings 26 in website 24. In response to requests 30, social media server cluster 14 sends postings 26 to posting extraction device 12.

Posting extraction device 12 then extracts data 28 that is relevant to risk-based authentication. To this effect, posting extraction device 12 searches for postings 26 having particular keywords, e.g., "credit card," "account," "money," "transfers," and so on. From these postings 26, posting extraction device 12 extracts data relevant to risk assessment from the postings 26. To accomplish this, in some arrangements, posting extraction device operates a site-specific API for extracting both data and metadata 28 associated with postings 26. Further details of this data extraction will be discussed below in connection with FIG. 4.

Once posting extraction device 12 extracts data 28 (from each posting, or after a sufficient number of postings extracted), posting extraction device 12 sends extracted posting data 28 to transaction database 20 for storage. For example, if extracted posting data 28 contains a name or a user identifier, posting extraction device 12 issues a query to see if that name or identifier exists in the database. If that name is in fact located, then posting extraction device 12 sends extracted posting data 28 to transaction database 20 to be associated with other transaction-related data under that name. Posting extraction server 12 may also search transaction database 20 over other parameter values such as geolocations.

At some point in time after extracted posting data 28 is stored in transaction database 20, bank server 22 issues a request to authenticate transaction 32 and sends this request to risk-based authentication server 16. Transaction 32 is defined by values of parameters involved in, e.g., a transfer of money from a payer to a payee, such as geolocation, time of transaction, transaction amount, etc.

Upon receiving the request to authenticate transaction 32, risk-based authentication server 16 issues a database access query 34 to acquire information relevant to assigning a risk score to transaction 32 for authentication. For example, risk-based authentication server 16 locates historical transaction data relevant to times of transactions and geolocations. In addition, however, risk-based authentication server 16 also locates posting data 36 that reflects more recent data that is not necessarily related to, and even diverges from, the historical data.

As an example, consider the example in which a customer has his credit card stolen. The theft of the credit card is not part of the behavioral profile on which risk-based authentication server 16 typically assigns a risk score. Rather, it is a discontinuous event that affects how the risk score is computed. The fact that the credit card is stolen will substantially increase the risk score in most cases; one exception may be if the posting was deemed to be false by some other evidence.

Further details of posting extraction device 12 and risk-based authentication server 16 are discussed below in connection with FIG. 2 and FIG. 3.

Figure 2:
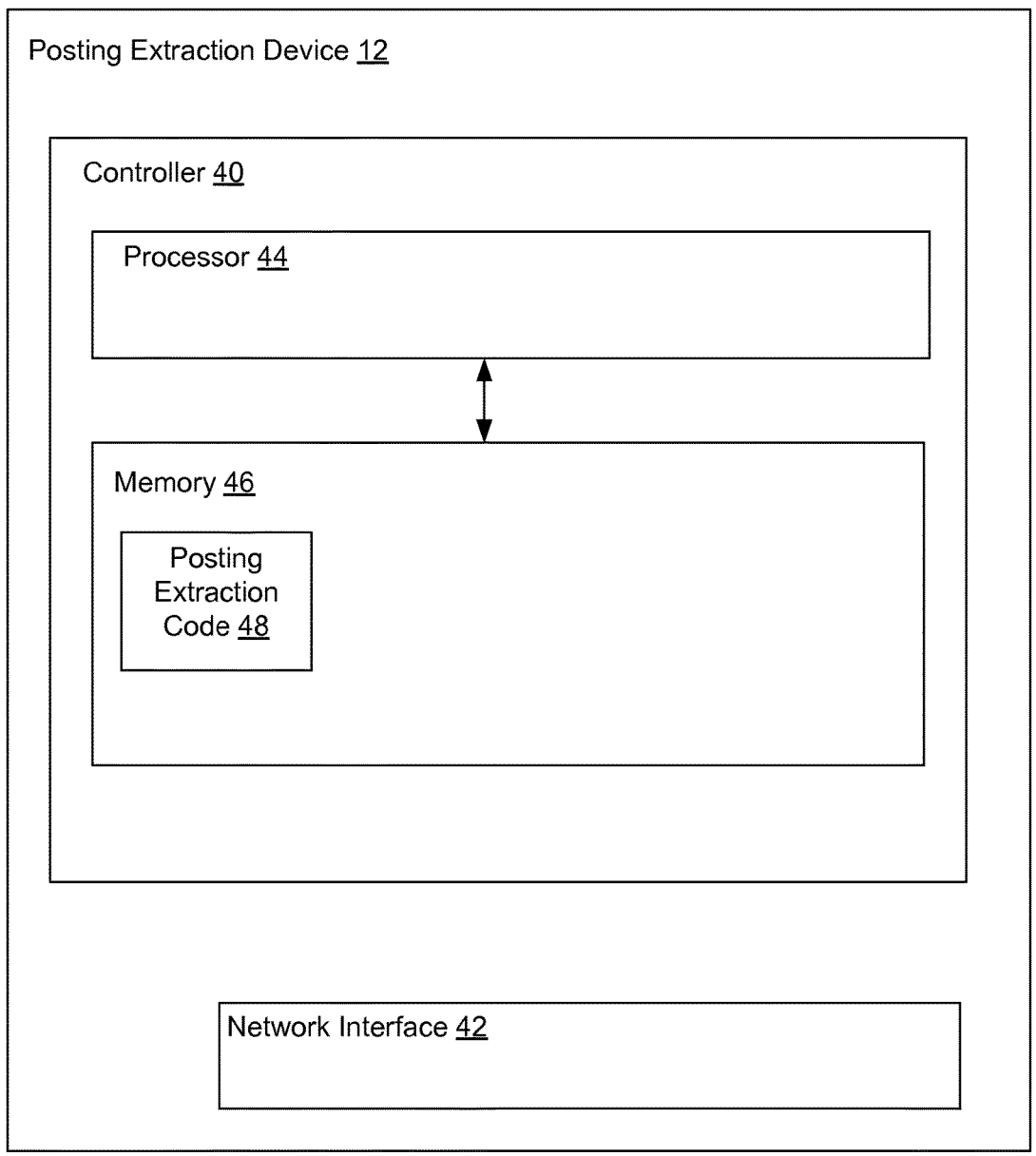
FIG. 2 is block diagram illustrating an example posting extraction device within the electronic environment shown in FIG. 1.

FIG. 2 illustrates posting extraction device 12. Posting extraction device 12 includes controller 40, which in turn includes processor 44 and memory 46, and network interface 42.

Network interface 42 takes the form of an Ethernet card; in some arrangements, network interface 42 takes other forms including that of a wireless receiver or a token ring card, for example.

Memory 46 is configured to store posting extraction code 48. Memory 46 generally takes the form of, e.g., random access memory, flash memory and/or non-volatile memory.

Processor 44 include a single or multiple cores each capable of running single or multiple threads. Processor 44 is coupled to memory 46 and is configured to execute instructions from posting extraction code 48.

Figure 3:
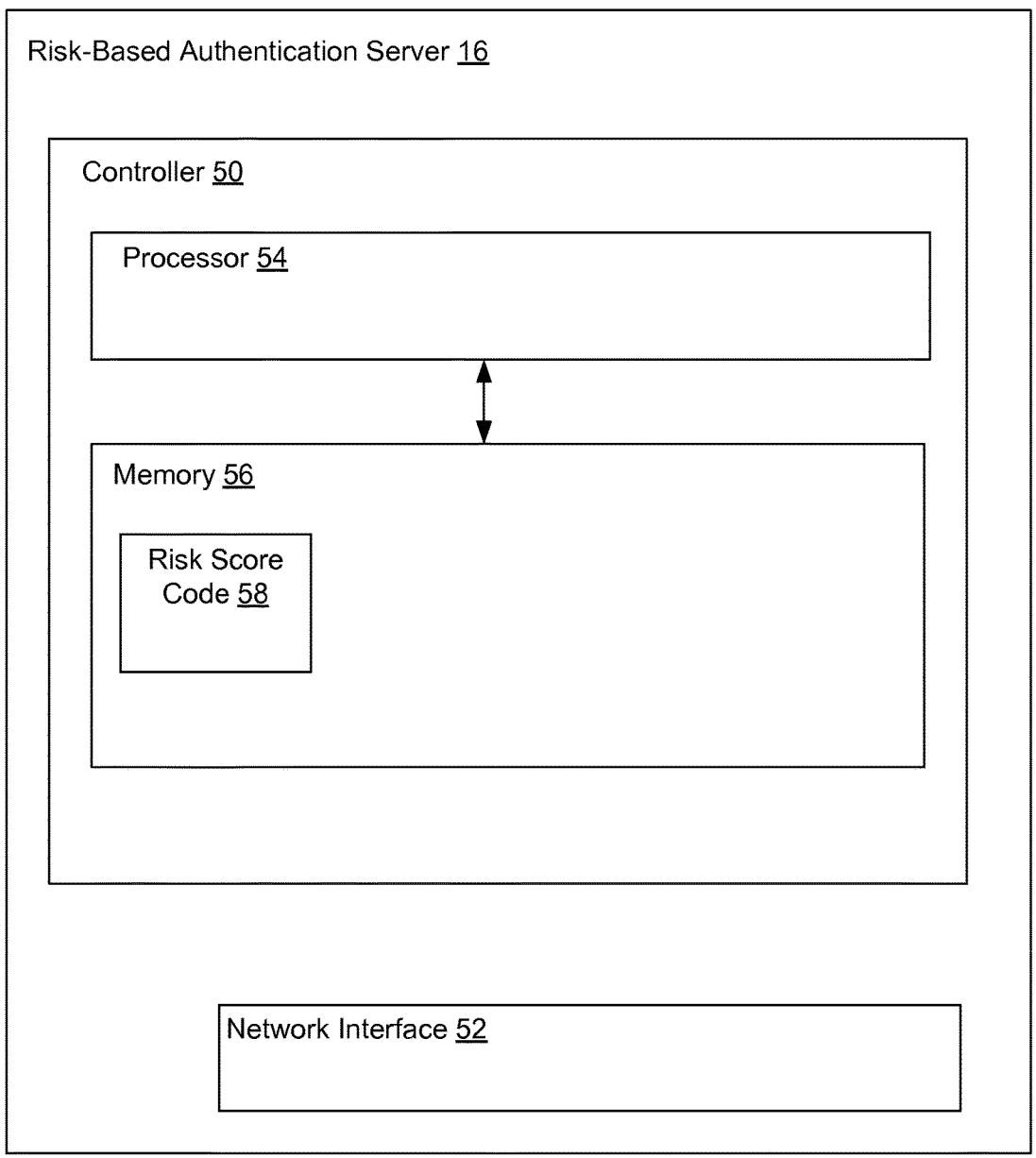
FIG. 3 is a block diagram illustrating an example risk-based authentication server within the electronic environment shown in FIG. 1.

FIG. 3 illustrates risk-based authentication server 16. Risk-based authentication server 16 includes controller 50, which in turn includes processor 54 and memory 56, and network interface 52.

Network interface 52 takes the form of an Ethernet card; in some arrangements, network interface 52 takes other forms including that of a wireless receiver or a token ring card, for example.

Memory 56 is configured to store risk score code 58. Memory 56 generally takes the form of, e.g., random access memory, flash memory and/or non-volatile memory.

Processor 54 include a single or multiple cores each capable of running single or multiple threads. Processor 54 is coupled to memory 56 and is configured to execute instructions from risk score code 58.

FIG. 4 illustrates an example posting 60 that is extracted by posting extraction device 12. Posting 60 is an example Twitter posting ("tweet") that includes metadata 62 which would be included in an extraction using a Twitter API. Posting 60 follows the above example of a bank customer who has had his credit card stolen in Boston. In reaction to the theft, the customer posts a tweet, exclaiming: "Hi man my credit card was stolen. What a bummer".

In this case, posting extraction device 12 locates this tweet because the text contains the keyword "credit card." From there, the Twitter API sorts the data, i.e., the text of the tweet, and metadata which provide information that may be used by risk-based authentication server 16 to assess risk in transactions that may use this credit card or involve the user.

FIG. 4 also illustrates example extracted data 64. In this case, extracted data 64 includes a posting location, given by GPS coordinates (42.36, −71.13) (in downtown Boston). Extracted data 64 also includes a posting time, which is the time at which social network server cluster 14 receives the tweet, which in this case is at 4:55 PM on 14 Oct. 2013. Extracted data 64 further includes a user identifier which, in this case, is the customer's name, "Arnault Meunier".

Extracted data 64 also includes the original tweet text. Posting extraction device 12 parses this tweet to reveal the keywords of interest. In this case, the main keywords are "credit card" and "stolen." This information is enough for an authentication system to know that something happened to the credit card of Arnault Meunier. In some arrangements, posting extraction device 12 locates the user Arnault Meunier in database 20 and notes that the credit card has been reported stolen as of 4:55 PM on 14 Oct. 2013.

In some arrangements, however, posting extraction device 12 also performs a sentiment analysis 66 on the tweet. That is, posting extraction device 12 finds other keywords in the tweet, including "stolen" and "bummer," and concludes that the user who sent the tweet was unhappy, i.e., the sentiment of the tweet is negative. Sentiment analysis, however, is concerned not only with keywords, but context (which may require analysis of other tweets) and in other situations, such a tweet may be found to have a positive sentiment.

The utility of this information may be seen from sample transaction data 70. In this example, the thief has gone to a nearby (GPS coordinates (42.37, −71.17)) retailer about 20 minutes after the theft and is attempting to make a purchase of $2327.86 on the stolen credit card. Risk-based authentication server assesses risk in this case by analyzing the difference in location and time. In this example, as the locations and times are proximate, the risk that a stolen credit card is being used is high, and risk-based authentication server 16 assigns the transaction a high risk score.

It should be understood that, without the improved technique, risk-based authentication server 16 would assign a low risk score to this transaction because the transaction takes place near the historical time and in the historical location of other transactions involving this credit card. (The amount may raise the risk score, but the other factors point to the cardholder likely making the purchase.) With the improved technique, however, the theft of the credit card is known to risk-based authentication server 16 potentially as soon as the credit card holder posts the tweet.

FIG. 5 illustrates a method 100 of providing security, including steps 102, 104, and 106. In step 102, processing circuitry, e.g., posting extraction device 12, observes postings, e.g., postings 26, aggregated in a public electronic forum by a website, e.g., website 24. In step 104, the processing circuitry extracts data, e.g., data 28, from the observed postings. In step 106, e.g., risk-based authentication server 16 assigns risk scores to a set of electronic transactions, e.g., transactions 32 based on the extracted data, the risk scores being indicative of a risk of fraud in the set of electronic transactions.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has dealt mainly with social networking sitew. In some arrangements, however, posting extraction device 12 may use the improved techniques to extract postings from new sites as as CNN, Reddit, and the like.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of employing social media data to improve accuracy of risk-based authentication, the method comprising:
observing, on a continual basis by processing circuitry of a posting extraction device, postings aggregated in a social media forum, said observing including (i) sending, by the posting extraction device, social media access requests to the social media forum to access a set of postings on the social media forum and (ii) searching, by the posting extraction device, the set of postings to identify a user post of a poster, the user post containing any of a set of keywords, each of the set of keywords having a specified impact on a risk score;
extracting, by the posting extraction device, data from the observed postings, the data including posting data from the user post, the posting data including discontinuous event data that includes at least one of the set of keywords and a time when the user post was made; and
assigning, by a risk-based authentication server, risk scores to a set of electronic transactions based on the extracted data, the risk scores being indicative of a risk of fraud in the set of electronic transactions, wherein assigning the risk scores includes, for a particular risk score, (i) computing a first risk score component based on a previous electronic transaction, (ii) computing a second risk score component based on the discontinuous event data, and (iii) producing the particular risk score based on the first risk score component and the second risk score component,
wherein the method further comprises:
storing the posting data from the user post in a transaction database in connection with a user identifier of the poster and further in connection with transaction history information of the poster;
receiving, by the risk-based authentication server after the user post was made, a request to authenticate an electronic transaction, the request to authenticate specifying the user identifier of the poster and a time when the request to authenticate is made; and
in response to the risk-based authentication server determining (a) that the time when the user post was made is more recent than any prior electronic transaction associated with the user identifier in the transaction history information and (b) that the posting data from the user post contains at least one of the set of keywords, (i) assigning a high risk score to the electronic transaction and (ii) preventing the electronic transaction from going forward.

2. The method as in claim 1, wherein each of the set of electronic transactions includes values of transaction parameters;
wherein each of the observed postings includes metadata, the metadata including values of posting parameters;
wherein the method further comprises:
extracting the metadata of the observed postings; and
storing the values of the posting parameters in the transaction database; and
wherein assigning the risk scores includes:
accessing the values of the posting parameters stored in the transaction database.

3. The method as in claim 2, wherein the values of the posting parameters of the metadata of a posting include the user identifier; and
wherein storing the values of the posting parameters in the transaction database includes:
placing the values of the posting parameters in a location in the transaction database according to the user identifier.

4. The method as in claim 2, wherein assigning the risk scores to the set of electronic transactions further includes:
performing a comparison operation on a value of a transaction parameter of an electronic transaction of the set of electronic transactions with a value of a posting parameter of the set of posting parameters of the extracted metadata, and generating the particular risk score based on a result of the comparison operation.

5. The method as in claim 4, wherein performing the comparison operation includes:
comparing the time when the user post was made with the time when the request to authenticate was made to produce a time difference, the particular risk score being based on the time difference.

6. The method as in claim 4, wherein the values of the posting parameters of the metadata of a posting include a geolocation indicating a location where the posting was introduced into the social media forum;
wherein performing the comparison operation includes:
comparing the value of the geolocation of the posting with a geolocation at which an electronic transaction was initiated to produce a location difference, the particular risk score being based on the location difference.

7. The method as in claim 1, further comprising:
performing sentiment analysis on the set of keywords, a result of the sentiment analysis being one of a negative sentiment and a positive sentiment, the negative sentiment indicating an environment in which the risk of fraud in the electronic transaction is high, the positive sentiment indicating an environment in which the risk of fraud in the electronic transaction is low; and
wherein assigning the risk scores includes:
generating the particular risk score based on the result of the sentiment analysis.

8. The method as in claim 1, wherein computing the first risk score component includes:
obtaining previous values of a transaction factor associated with the user identifier;
obtaining a new value of the transaction factor from the request to authenticate the electronic transaction; and
producing, as the first risk score component, a number indicating a likelihood that the transaction factor would have the new value given that the transaction factor has had the previous values,
wherein each of the observed postings includes metadata, the metadata including values of posting parameters;
wherein computing the second risk score component includes:
extracting the metadata of the observed postings;
accessing the values of the posting parameters from the metadata; and
producing, as the second risk score component, a number indicating a likelihood that the electronic transaction is fraudulent based on the values of the posting parameters, and
wherein producing the particular risk score based on the first risk score component and the second risk score component includes forming a sum of the first risk score component and the second risk score component.

9. The method as in claim 1, wherein the set of keywords includes a word or phrase associated with an occurrence of a discontinuous event which increases a risk of fraud and which cannot be detected based solely on post time and location.

10. A computer program product having a non-transitory, computer-readable storage medium that stores instructions which, when executed by a controller, cause the controller to carry out a method of employing social media data to improve accuracy of risk-based authentication, the method comprising:

observing, on a continual basis by processing circuitry of a posting extraction device, postings aggregated in a social media forum, said observing including (i) sending, by the posting extraction device, social media access requests to the social media forum to access a set of postings on the social media forum and (ii) searching, by the posting extraction device, the set of postings to identify a user post of a poster, the user post containing any of a set of keywords, each of the set of keywords having a specified impact on a risk score;
extracting, by the posting extraction device, data from the observed postings, the data including posting data from the user post, the posting data including discontinuous event data that includes at least one of the set of keywords and a time when the user post was made; and
assigning, by a risk-based authentication server, risk scores to a set of electronic transactions based on the extracted data, the risk scores being indicative of a risk of fraud in the set of electronic transactions, wherein assigning the risk scores includes, for a particular risk score, (i) computing a first risk score component based on a previous electronic transaction, (ii) computing a second risk score component based on the discontinuous event data, and (iii) producing the particular risk score based on the first risk score component and the second risk score component,
wherein the method further comprises:
storing the posting data from the user post in a transaction database in connection with a user identifier of the poster and further in connection with transaction history information of the poster;
receiving, by the risk-based authentication server after the user post was made, a request to authenticate an electronic transaction, the request to authenticate specifying the user identifier of the poster and a time when the request to authenticate is made; and
in response to the risk-based authentication server determining (a) that the time when the user post was made is more recent than any prior electronic transaction associated with the user identifier in the transaction history information and (b) that the posting data from the user post contains at least one of the set of keywords, (i) assigning a high risk score to the electronic transaction and (ii) preventing the electronic transaction from going forward.

11. The computer program product as in claim 10, wherein each of the set of electronic transactions includes values of transaction parameters;
wherein each of the observed postings includes metadata, the metadata including values of posting parameters;
wherein the method further comprises:
extracting the metadata of the observed postings; and
storing the values of the posting parameters in the transaction database; and
wherein assigning the risk scores includes:
accessing the values of the posting parameters stored in the transaction database.

12. The computer program product as in claim 11, wherein the values of the posting parameters of the metadata of a posting include the user identifier; and
wherein storing the values of the posting parameters in the transaction database includes:
placing the values of the posting parameters in a location in the transaction database according to the user identifier.

* * * * *